UNITED STATES PATENT OFFICE.

MARTIN EKENBERG, OF LONDON, ENGLAND, ASSIGNOR, BY MESNE ASSIGNMENTS, TO WETCARBONIZING LIMITED, OF LONDON, ENGLAND.

BRIQUETING OF CARBONIZED PEAT AND THE LIKE.

1,143,951.         Specification of Letters Patent.      Patented June 22, 1915.

No Drawing.      Application filed June 5, 1909.   Serial No. 500,343.

*To all whom it may concern:*

Be it known that I, MARTIN EKENBERG, a subject of the King of Sweden, and residing at No. 37 Queen Victoria street, London, E. C., England, have invented new and useful Improvements Relating to the Briqueting of Carbonized Peat and the like, of which the following is a specification.

This invention relates to the briqueting of moist wet carbonized peat, that is to say raw peat which in order to render its contained water freely expressible has been heated with water to a temperature of between 150 deg. and 250 deg. centigrade in a closed vessel. Such a process insures that all or nearly all of the hydrocarbons contained in the peat before the commencement of the carbonization treatment shall be retained in the carbonized product notwithstanding the carbonization. Carbonized peat of this character is obtained for example by the wet carbonizing process set out in my patents numbered 830,311 and 847,748.

It has been found that carbonized peat of the above mentioned character cannot be satisfactorily briqueted by the method commonly adopted with peat prepared for briqueting in the ordinary manner, such for example as by air drying. By these ordinary methods there must be a large percentage of free water—say from 10% to 15%—left in the peat in order that the briquet shall bind and keep its form; but this water is a source of much difficulty during the briqueting operation because if the temperature used be allowed to rise above 100° C. steam is produced which has a deleterious effect upon the briqueting, causing the briquet to crack afterward or even causing explosions during the briqueting operation. It is necessary therefore to keep the temperature below the boiling point of the water, as by circulating cold water through the dies. As previously mentioned however if peat of the character referred to in the first paragraph of this specification be briqueted in the manner mentioned as usual with ordinary peat the material does not bind satisfactorily and the briquet is unduly brittle and liable to disintegrate when subjected to the heat of the fire. This difficulty could be reduced of course by the addition of binding materials but the employment of binding materials is generally undesirable in all peat briquets.

The object of the present invention is to provide a method whereby the product hereinbefore referred to may be formed into satisfactory briquets which shall be free from the disadvantages above indicated.

The invention consists in first drying the carbonized peat so that only a small percentage of free moisture remains in it and then subjecting it to pressure at a temperature above 120° C. in a high pressure briqueting press.

In carrying the invention into effect according to one manner, I take the carbonized substance referred to in the first paragraph of this specification and remove the moisture from it by heating it in an open drier to a temperature of from about 100° C. to about 120° C., and then subject it to a temperature above 120° C. in a closed drier. It is then passed in its highly heated condition into a high pressure open die briqueting press.

The drying process must leave the material practically free from moisture before it enters the press. It is preferable that the heating in the closed drier shall be considerable higher than 120° C. but the temperature should not much exceed the temperature at which carbonization of the peat or the like was effected in order that the hydrocarbons may not be released. A convenient amount of moisture to be left in the briquet is 2%.

Having now described my invention what I claim as new and desire to secure by Letters Patent is:—

1. A method of producing peat briquet fuel in which the water binding properties of the peat are destroyed by heating the wet raw material to an elevated temperature under pressure preventing ebullition, dewatering the material and carrying this dewatering to such a point that the product contains at most about 2% of water, then heating the material to a temperature above 100° C., to develop binding properties therein, and thereafter consolidating the material by pressure.

2. In the production of briquets from wet carbonized peat, drying the wet carbonized peat to a moisture content of at most about 2%, then heating the material to a temperature above 100° C. to develop binding properties therein, and thereafter consolidating the material by pressure.

In testimony whereof I affix my signature in presence of two witnesses.

MARTIN EKENBERG.

Witnesses:
P. M. DAVIES,
BERTRAM H. MATTHEWS.